US010389448B1

(12) United States Patent
Doerr

(10) Patent No.: US 10,389,448 B1
(45) **Date of Patent: *Aug. 20, 2019**

(54) SILICON PHOTONICS MULTICARRIER OPTICAL TRANSCEIVER

(71) Applicant: Acacia Communications, Inc., Maynard, MA (US)

(72) Inventor: Christopher Doerr, Middletown, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,889

(22) Filed: May 4, 2018

Related U.S. Application Data

(63) Continuation of application No. 13/894,367, filed on May 14, 2013, now Pat. No. 10,009,106.

(60) Provisional application No. 61/646,517, filed on May 14, 2012.

(51) Int. Cl.

| | |
|---|---|
| ***H04B 10/40*** | (2013.01) |
| ***H04B 10/50*** | (2013.01) |
| ***H04B 10/54*** | (2013.01) |
| ***H04B 10/60*** | (2013.01) |
| ***H04B 10/556*** | (2013.01) |

(52) U.S. Cl.
CPC ........... *H04B 10/40* (2013.01); *H04B 10/505* (2013.01); *H04B 10/506* (2013.01); *H04B 10/541* (2013.01); *H04B 10/556* (2013.01); *H04B 10/60* (2013.01)

(58) Field of Classification Search
CPC .... H04B 10/40; H04B 10/505; H04B 10/506; H04B 10/541; H04B 10/556; H04B 10/60
USPC .................................. 398/135–40, 135–140
See application file for complete search history.

(56) References Cited

U.S. PATENT DOCUMENTS

| | | | |
|---|---|---|---|
| 7,379,633 B1 | 5/2008 | Ashley et al. | |
| 7,724,991 B1 | 5/2010 | Doerr et al. | |
| 8,014,680 B2 * | 9/2011 | Lee | H04L 25/03343 375/220 |
| 8,498,542 B2 * | 7/2013 | Frankel | H04B 10/5053 398/184 |
| 8,548,333 B2 | 10/2013 | Nagarajan et al. | |
| 9,195,079 B2 | 11/2015 | Doerr et al. | |
| 10,009,106 B2 * | 6/2018 | Doerr | H04B 10/505 |
| 2003/0123796 A1 | 7/2003 | Wang et al. | |
| 2003/0133339 A1 | 7/2003 | Estes et al. | |
| 2004/0136647 A1 | 7/2004 | Mizuno et al. | |
| 2005/0053380 A1 | 3/2005 | Kim et al. | |

(Continued)

OTHER PUBLICATIONS

Liu et al; Towards 1-Tb/s per-channel optical transmision based on multi-carrier modulation; 2010; IEEE.*

(Continued)

*Primary Examiner* — Amritbir K Sandhu
(74) *Attorney, Agent, or Firm* — Joseph D'Angelo

(57) ABSTRACT

Disclosed herein are techniques, methods, structures and apparatus that provide a silicon photonics multicarrier optical transceiver wherein both the transmitter and receiver are integrated on a single silicon chip and which generates a plurality of carriers through the effect of an on-chip modulator, amplifies the optical power of the carriers through the effect of an off-chip amplifier, and generates M orthogonal sets of carriers through the effect of an on-chip basis former.

20 Claims, 4 Drawing Sheets

(56) References Cited

U.S. PATENT DOCUMENTS

2005/0100345 A1 5/2005 Welch et al.
2005/0286909 A1 12/2005 Kish, Jr. et al.
2006/0067426 A1 3/2006 Maltsev et al.
2006/0098985 A1 5/2006 Sakai et al.
2006/0133813 A1 6/2006 Ekkizogloy et al.
2006/0147217 A1* 7/2006 Hahin .................... H04B 10/40 398/135
2007/0031153 A1 2/2007 Aronson et al.
2007/0140618 A1* 6/2007 Doerr ................. G02B 6/12011 385/37
2007/0274653 A1 11/2007 Watanabe et al.
2008/0013881 A1 1/2008 Welch et al.
2008/0031630 A1 2/2008 Ohira et al.
2008/0037994 A1 2/2008 Crews
2008/0069570 A1 3/2008 Dallesasse
2008/0186843 A1 8/2008 Ma et al.
2008/0231944 A1* 9/2008 Doerr ................. H04B 10/2507 359/337.1
2009/0047026 A1* 2/2009 Luo ........................ H04B 10/40 398/135
2009/0087155 A1 4/2009 Watanabe
2009/0092393 A1 4/2009 Xu et al.
2009/0136238 A1 5/2009 Gill et al.
2009/0208222 A1 8/2009 Oku
2010/0008675 A1 1/2010 De Dobbelaere
2010/0092128 A1 4/2010 Okayama
2011/0020003 A1* 1/2011 Yu ........................ H04B 10/548 398/79
2011/0064417 A1 3/2011 Sato
2011/0069975 A1* 3/2011 Liu ........................ H04B 10/61 398/202
2011/0206382 A1 8/2011 Elselt et al.
2011/0243556 A1* 10/2011 Nagarajan .............. H04B 10/40 398/43
2011/0267676 A1* 11/2011 Dallesasse .............. H01S 5/021 359/279
2012/0001166 A1 1/2012 Doany et al.
2012/0051689 A1 3/2012 Okayama et al.
2012/0177371 A1 7/2012 Lee et al.
2012/0207479 A1 8/2012 Krishnamoorthy et al.
2012/0230690 A1* 9/2012 Doerr ................. G02B 6/12033 398/49
2012/0301142 A1* 11/2012 Huang .................. H04J 14/002 398/48
2013/0058648 A1* 3/2013 Ji ........................ H04J 14/0221 398/38
2013/0071122 A1 3/2013 Sasaki
2013/0088765 A1* 4/2013 Duthel ................. H04B 10/506 359/259
2013/0121706 A1* 5/2013 Yang .................... H04B 10/506 398/187
2013/0209020 A1* 8/2013 Doerr ...................... G02F 1/011 385/2
2013/0302031 A1 11/2013 Tanimura et al.
2014/0036937 A1* 2/2014 Doerr ..................... H04B 10/40 370/535
2014/0153931 A1* 6/2014 Doerr .................. H04B 10/505 398/135
2014/0205286 A1* 7/2014 Ji .......................... H04B 10/40 398/45
2015/0110494 A1 4/2015 Ghelfi et al.
2015/0311976 A1 10/2015 Ishizaka
2015/0358083 A1* 12/2015 Doerr ....................... G02B 6/00 398/139
2016/0013609 A1* 1/2016 Doerr ................. H01S 3/10015 372/20
2017/0142504 A1* 5/2017 Hochberg .............. H04B 10/40
2017/0353262 A1* 12/2017 Zheng ................. H04J 14/0204
2018/0041282 A1* 2/2018 Chen .................... H04B 10/035

OTHER PUBLICATIONS

Liu et al; Towards 1-Tb/ per-channel optical transmission based on multi-carrier modulation, 2010; IEEE. (Year: 2010).*

Liu et al; A kind of single light source coherent transceiver scheme to eliminate Rayleigh Back scattering related Impacts; 2012; IEEE; pp. 533-536 (Year: 2012).*

Jones et al., Silicon Photonics Applications, Challenges and Future Directions. Optical Society of America. 2006; 2 pages.

Liu et al., A kind of Single Light Source Coherent Transceiver Scheme to Eliminate Rayleigh Backscattering Related Impacts. 2012 Second International Conference on Instrumentation & Measurement, Computer, Communcation and Control. IEEE. 2012; pp. 533-536.

Liu et al., Towards 1-Tb/s Per-Channel Optical Transmission Based on Multi-Carrier Modulation. IEEE. 2010; 4 pages.

Nagarajan et al., 10 Channel, 1OOGbit/s per Channel, Dual Polarization, Coherent QPSK, Monolithic InP Receiyer Photonic Integrated Circuit. Optical Fiber Communication Conference. Los Angeles, CA. Mar. 6-10, 2011. Paper OML7. doi: 10.1364-0FC.2011. 0ML7. 3 pages.

* cited by examiner

SILICON PHOTONICS MULTICARRIER OPTICAL TRANSCEIVER

RELATED APPLICATIONS

This Application is a continuation claiming the benefit under 35 U.S.C. § 120 of U.S. patent application Ser. No. 13/894,367, filed on May 14, 2013, entitled "SILICON PHOTONICS MULTICARRIER OPTICAL TRANSCEIVER", which is hereby incorporated herein by reference in its entirety, which claims the benefit under 35 U.S.C. § 119(e) of U.S. Provisional Patent Application Ser. No. 61/646,517, filed on May 14, 2012, entitled "SILICON PHOTONICS MULTICARRIER OPTICAL TRANSCEIVER," which is hereby incorporated herein by reference in its entirety.

TECHNICAL FIELD

This disclosure relates generally to the field of optical communications and in particular to techniques, methods and apparatus pertaining to silicon photonics multicarrier coherent transceiver that allows for higher data rates without requiring higher speed analog-to-digital converters (ADCs) and digital-to-analog converters (DACs) or higher order constellations.

BACKGROUND

Contemporary optical communications and other systems require reliable transceivers exhibiting high data rates. Consequently, methods, structures or techniques that facilitate the development or improvement of such transceivers—particularly those that do not require higher speed ADCs or DACs—would represent a welcome addition to the art.

BRIEF SUMMARY

An advance in the art is made according to an aspect of the present disclosure directed to a silicon photonics multicarrier coherent transceiver wherein both receiver and transmitter are integrated onto the same silicon substrate.

Viewed from a first aspect, the present disclosure is directed to a silicon photonics multicarrier coherent transceiver that is integrated onto a single silicon substrate and employs a single laser—that is advantageously either off-chip or integrated on-chip using a gain chip. Advantageously transceivers according to the present disclosure generate a plurality of carriers using on-chip modulators, employ off-chip amplifiers to boost optical power, and uses basis former(s) to generate M orthogonal sets of carriers. Of particular advantage is the use of a basis former that includes a power splitter connected to M waveguides of different length.

BRIEF DESCRIPTION OF DRAWINGS

A more complete understanding of the present disclosure may be realized by reference to the accompanying drawings in which:

FIGS. 2A and 2B show a schematic of basis formers according to an aspect of the present disclosure wherein FIG. 2A depicts a demultiplexer each output having one carrier while FIG. 2B includes M arms of different path lengths connected to a power splitter, each output having all three carriers but with relative phase shifts of ±120° between them such that the three sets are mutually orthogonal;

DETAILED DESCRIPTION

Figure 1:
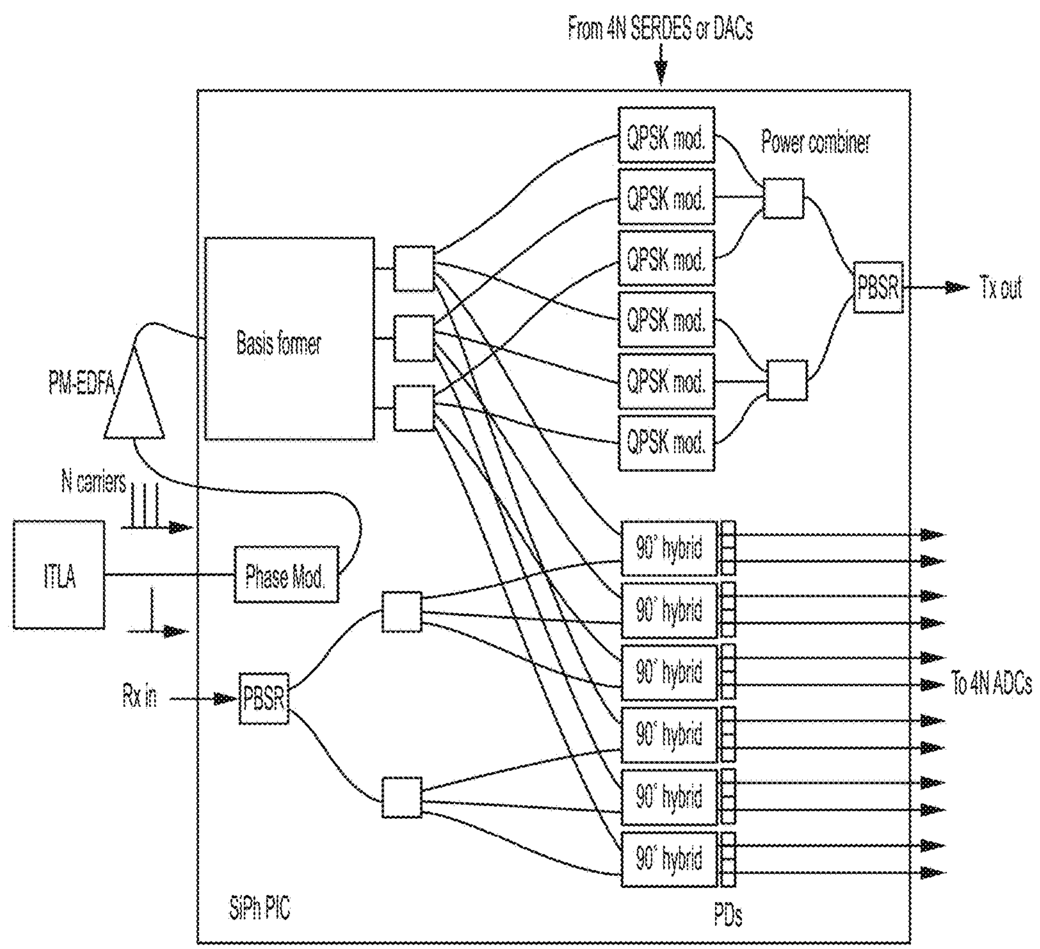
FIG. 1 shows a schematic top-view of a multi-carrier coherent transceiver photonics integrated circuit according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, it is noted that previous demonstrations of multicarrier coherent transceivers have been made. For example, R. Nagarajan has described in a paper entitled "10 Channel, 100 Gbit/s per Channel, Dual Polarization, Coherent QPSK, Monolithic InP Receiver Photonic Integrated Circuit" which was presented at the Optical Fiber Communication Conference, 2011, p. OML7, however devices such as those described therein include 10 integrated lasers. Those skilled in the art will quickly recognize the difficulty associated with making such devices with high yield on a single chip and in particular where they all must be wavelength stabilized. Additionally, the devices disclosed therein use InP as the integration platform which is difficult to fabricate in high yield. Furthermore, the devices disclosed therein use separate chips for transmit and receive which requires additional packaging. Finally, devices such as those disclosed by Nagarajan may exhibit a poor spectral efficiency as they are limited by their wavelength stability to a relatively wide wavelength separation and such devices may have channels that are relatively narrow-band and thus susceptible to nonlinearities.

Turning now to FIG. 1, there is shown a schematic top-view of a multicarrier coherent transceiver PIC according to an aspect of the present disclosure. As depicted in FIG. 1, N=M=3; PBSR=polarization splitter and rotator; ITLA—integrated tunable laser assembly; PM-EDFA-polarization maintaining Er-doped fiber amplifier; and PD=photodetector.

Operationally, an integrated tunable laser assembly (ITLA) generates a narrow-linewidth continuous-wave laser (optical) signal. The generated optical signal enters a silicon PIC (SiPhPIC) where it is directed to a phase modulator which is preferably driven sinusodially at a frequency f. As may be appreciated, a single phase modulator may readily generate two sidebands exhibiting the same height as the carrier, resulting in three carriers. As may be further appreciated, the phase modulator may be replaced or substituted by an amplitude modulator or a combination of an amplitude modulator and a phase modulator.

Advantageously, other modulator schemes known in the art may be used to generate multiple carriers. More particularly, and by way of example, a modulator positioned within a ring resonator may be used to generate multiple carriers. Yet another exemplary alternative may include an arrangement of single-sideband modulators.

For the purposes of this discussion and as depicted in FIG. 1, we let N be the total number of carriers exiting the modulator assembly. Typically, these N carriers do not exhibit enough optical power to supply both the modulator inputs in the transmitter and the local oscillators in the receiver. As a result—and according to an aspect of the present disclosure—the N carriers are directed from the PIC to an off-chip, Er-doped fiber amplifier (EDFA) where they are amplified through the effect of the EDFA.

As may be appreciated, it is preferred that the EDFA be polarization maintaining, however this is not absolutely necessary. Alternatively, a semiconductor gain element known in the art may be employed wherein that gain element is attached directly to the PIC or coupled via fiber coupler.

The amplified carriers are then directed from the EDFA to the PIC where they enter a "basis former". The basis former splits the N carriers into M orthogonal sets, where M<=N.

Figure 2A:
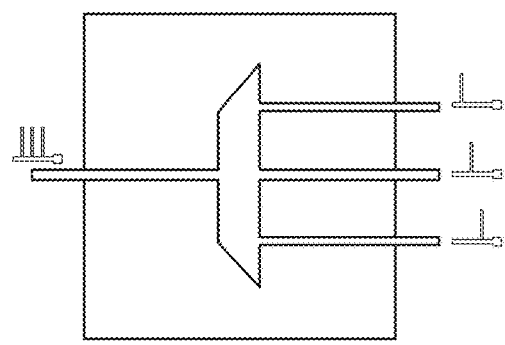
Figure 2B:
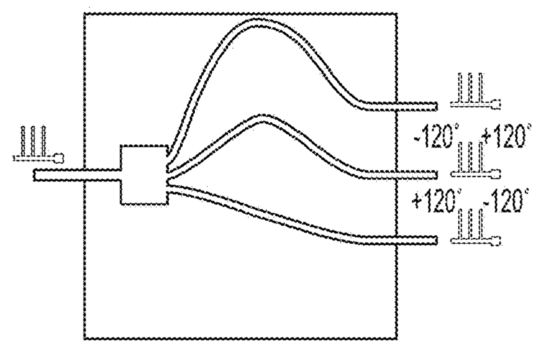

Two examples of basis formers according to an aspect of the present disclosure for three carriers (N=3) are shown schematically in FIGS. 2A-2B. As depicted in FIG. 2A, the basis former comprises a wavelength demultiplexer wherein each output is a separate one of the three carriers. Such a basis former may be constructed from an arrayed waveguide grating, Mach-Zehnder filters, or ring resonator filters. FIG. 2B shows an alternative basis former according to an aspect of the present disclosure. More specifically, the alternative embodiment shown in FIG. 2B comprises a 1×M power splitter followed by M waveguides of linearly increasing path length. In an exemplary embodiment, the path length difference between successive waveguides is defined by $c/(fn_gM)$, where c is the speed of light in a vacuum and $n_g$ is the waveguide group index.

One appreciable advantage of this configuration shown in FIG. 2B is that it does not require filters to remain constant despite temperature changes, as is the case with the configuration shown in FIG. 2A. Additionally, data for each "channel" is spread over the entire signal spectrum, thereby reducing effects of nonlinearities.

With continued reference to FIG. 1, it may be observed that outputs of the basis former are directed to a number of quadrature phase-shift keying (QPSK) modulators. As depicted therein, the number of QPSK modulators in 2N. The outputs of the modulators are subsequently combined by power converter(s). One half of the modulated outputs are polarization rotated, and then further combined through the effect of polarization splitter and rotator and subsequently output as combined Tx output signal.

Notably, modulators other than the QPSK modulators shown are contemplated according to the present disclosure. More particularly, 8-quadrature amplitude modulation (QAM) modulators may be employed equally well. One constraint on the modulator(s) employed however is that the modulator symbol rate should equal to or be less than f (as defined above).

Advantageously, the polarization splitter and rotator (PBSK) may comprise a 2D grating coupler for example. When such a 2D grating coupler is employed, explicit polarization rotators are not required and instead the 2D grating coupler combines the co-polarized inputs into a single, polarization multiplexed output.

With respect to receiver function(s), received signals (Rx input) are split through the effect of a PBSR and the resulting portions are directed into 90 degree hybrids where they are combined with some of the outputs from the basis former which act as local oscillators. Optical signals output from the hybrids are detected by photodetectors and directed to 4N analog to digital converters for subsequent processing.

Figure 3:
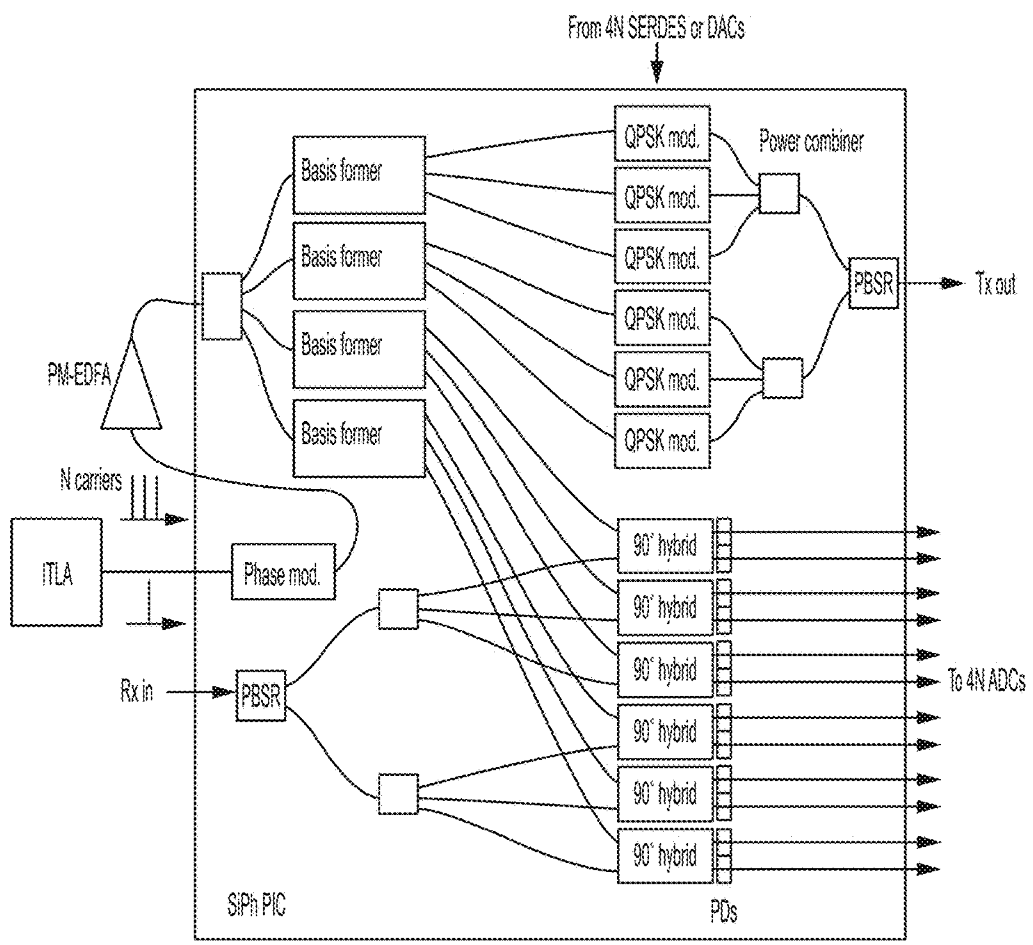
FIG. 3 shows another schematic configuration of an alternative multi-carrier coherent transceiver photonics integrated circuit according to an aspect of the present disclosure.

Turning now to FIG. 3, there it shows an alternative embodiment of a PIC according to an aspect of the present disclosure. As shown in FIG. 3, a number of additional basis formers are employed. Using the example of N=3 carriers, each of the individual basis formers outputs the N carriers which are then applied to an individual QPSK modulator or 90 degree hybrid as shown. A particular advantage of this exemplary configuration is that there are fewer waveguide crossings on the PIC as compared with the PIC shown in FIG. 1.

Figure 4:
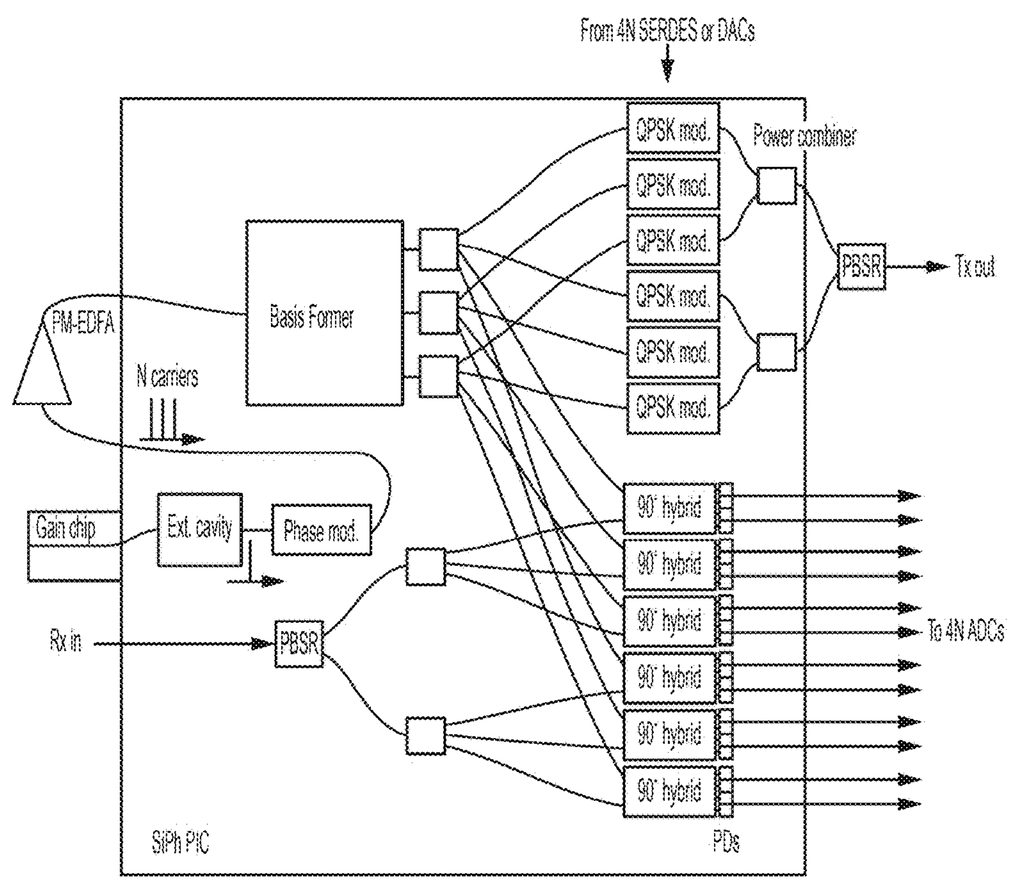
FIG. 4 shows another schematic configuration of an alternative multi-carrier coherent transceiver photonics integrated circuit according to an aspect of the present disclosure.

Turning now to FIG. 4, there is shown yet another PIC according to an aspect of the present disclosure. More specifically, the PIC shown in FIG. 4 includes an integrated CW laser.

Those skilled in the art will readily appreciate that while the methods, techniques and structures according to the present disclosure have been described with respect to particular implementations and/or embodiments, those skilled in the art will recognize that the disclosure is not so limited. More particularly, the variations depicted in the FIGUREs may be combined as appropriate. For example, the integrated laser of FIG. 4 may be included in the arrangement of FIG. 3 or FIG. 1. Accordingly, the scope of the disclosure should only be limited by the claims appended hereto.

What is claimed is:

1. An optical transceiver comprising:

a silicon substrate;

first and second transmitter modulators integrated on the silicon substrate;

first and second photodetectors integrated on the silicon substrate;

a carrier generator configured to receive as input an optical signal having an input carrier from an optical signal source and to generate, from the input carrier, a plurality of output carriers including a first output carrier and a second output carrier; and a basis former, coupled to the carrier generator, and having a first output port configured to provide the first output carrier to the first transmitter modulator and, separately, to the first photodetector and a second output port configured to provide the second output carrier to the second transmitter modulator and, separately, to the second photodetector.

2. The optical transceiver of claim 1, wherein the carrier generator is integrated on the silicon substrate.

3. The optical transceiver of claim 1, wherein the basis former is integrated on the silicon substrate.

4. The optical transceiver of claim 1, wherein the basis former comprises a wavelength demultiplexer configured to spatially separate the plurality of output carriers.

5. The optical transceiver of claim 1, wherein the carrier generator comprises a signal modulator.

6. The optical transceiver of claim 1, wherein the first photodetector is configured to beat the first output carrier with an input signal and the second photodetector is configured to beat the second output carrier with the input signal.

7. The optical transceiver of claim 1, wherein the basis former comprises a power splitter and first and second output waveguides, the first output waveguide being coupled to the first output port and the second output waveguide being coupled to the second output port, wherein the first output waveguide has a first length and the second output waveguide has a second length different from the first length.

8. The optical transceiver of claim 7, wherein the basis former further comprises a third output waveguide having a third length different from the first and second lengths, wherein the first, second and third lengths substantially conform to a linearly increasing relationship.

9. The optical transceiver of claim 1, wherein the basis former is coupled to the carrier generator through an optical amplifier disposed outside the silicon substrate.

10. The optical transceiver of claim 1, wherein the first and/or second transmitter modulators comprises a quadrature phase shift key (QPSK) modulator.

11. An optical transceiver comprising:

a silicon substrate;

first and second transmitter modulators integrated on the silicon substrate;

first and second photodetectors integrated on the silicon substrate;

a carrier generator configured to receive as input an optical signal having an input carrier from an optical signal source and to generate, from the input carrier, a plurality of output carriers including a first output carrier and a second output carrier;

a first basis former, coupled to the carrier generator, and having a first output port configured to provide the first output carrier to the first transmitter modulator and a second output port configured to provide the second output carrier to the second transmitter modulator; and a second basis former, coupled to the carrier generator, and having a first output port configured to provide the first output carrier to the first photodetector and a second output port configured to provide the second output carrier to the second photodetector.

12. The optical transceiver of claim 11, wherein the carrier generator is integrated on the silicon substrate.

13. The optical transceiver of claim 11, wherein the first and second basis formers are integrated on the silicon substrate.

14. The optical transceiver of claim 11, wherein the first basis former comprises a wavelength demultiplexer configured to spatially separate the plurality of output carriers.

15. The optical transceiver of claim 11, wherein the carrier generator comprises a signal modulator.

16. The optical transceiver of claim 11, wherein the first photodetector is configured to beat the first output carrier with an input signal and the second photodetector is configured to beat the second out carrier with the input signal.

17. The optical transceiver of claim 11, wherein the first basis former comprises a power splitter and first and second output waveguides, the first output waveguide being coupled to the first output port of the first basis former and the second output waveguide being coupled to the second output port of the first basis former, wherein the first output waveguide has a first length and the second output waveguide has a second length different from the first length.

18. The optical transceiver of claim 17, wherein the first basis former further comprises a third output waveguide having a third length different from the first and second lengths, wherein the first, second and third lengths substantially conform to a linearly increasing relationship.

19. The optical transceiver of claim 11, further comprising an optical power splitter coupled to the carrier generator, the optical power splitter being configured to provide the plurality of carriers to the first and second basis formers.

20. The optical transceiver of claim 11, wherein the first and second basis formers are coupled to the carrier generator through an optical amplifier disposed outside the silicon substrate.

* * * * *